United States Patent [19]
Horan et al.

[11] Patent Number: 6,078,338
[45] Date of Patent: Jun. 20, 2000

[54] ACCELERATED GRAPHICS PORT PROGRAMMABLE MEMORY ACCESS ARBITER

[75] Inventors: Ronald T. Horan, Houston; Phillip M. Jones, Spring; Gregory N. Santos, Cypress; Robert Allan Lester, Houston; Gary J. Piccirillo, Cypress, all of Tex.

[73] Assignee: Compaq Computer Corporation, Houston, Tex.

[21] Appl. No.: 09/038,412

[22] Filed: Mar. 11, 1998

[51] Int. Cl.[7] ........................... G06F 13/16
[52] U.S. Cl. ............... 345/521; 345/520; 345/513; 345/503; 711/100; 710/126; 710/128; 710/129
[58] Field of Search .................. 345/521, 520, 345/503, 501, 512; 711/100, 154, 158, 105, 111; 710/100, 126–129, 110, 112

[56] References Cited

U.S. PATENT DOCUMENTS

| | | | |
|---|---|---|---|
| 4,788,640 | 11/1988 | Hansen .................................... | 711/151 |
| 5,317,709 | 5/1994 | Sugimoto ................................ | 711/105 |
| 5,479,627 | 12/1995 | Khalidi et al. ........................... | 711/205 |
| 5,664,161 | 9/1997 | Fukushima et al. ..................... | 345/501 |
| 5,740,381 | 4/1998 | Yen ......................................... | 710/113 |
| 5,802,568 | 9/1998 | Csoppenszky .......................... | 711/136 |
| 5,812,789 | 9/1998 | Diaz et al. .............................. | 709/247 |
| 5,835,962 | 11/1998 | Chang et al. ........................... | 711/206 |
| 5,920,881 | 7/1999 | Porterfield .............................. | 711/2 |

OTHER PUBLICATIONS

Halfhill, "Unclogging the PC Bottlenecks", *BYTE* Sep. '97, vol. 22, No. 9.
Yong, "AGP Speeds 3D Graphics" *Microprocessor Report*, Jun. 17, 1996.
Brummer, "PCI–to–AGP Move Boosts 3–D Graphics" *Electronic Engineering Times*, 1997, n 952 p. 84.

*Primary Examiner*—Kee M. Tung
*Attorney, Agent, or Firm*—Paul N. Katz; Ronald L. Chichester; Frohwitter

[57] ABSTRACT

A computer system having a core logic chipset that interconnects a processor(s), a system memory and peripheral device agents. The core logic chipset has a programmable memory access arbiter that may be programmed to optimize accesses by the computer system processor(s) and agents to the system memory for best computer system performance. The memory access arbiter may be programmed specifically for each system agent. An access count register may be incorporated into the core logic chipset wherein each system agent may be represented by a portion of the access count register. The values programmed into the portions of the access count register determine how many memory accesses the associated agent may take before another agent is granted a memory access, and how many cachelines may be transferred during a memory access.

32 Claims, 5 Drawing Sheets

ACCELERATED GRAPHICS PORT PROGRAMMABLE MEMORY ACCESS ARBITER

CROSS REFERENCE TO RELATED PATENT APPLICATIONS

This patent application is related to commonly owned U.S. patent application Ser. No. 08/853,289; filed May 9, 1997; entitled "Dual Purpose Apparatus, Method And System For Accelerated Graphics Port and Peripheral Component Interconnect" by Ronald T. Horan and Sompong Olarig; and U.S. patent application Ser. No. 08/941,862; filed Sep. 30, 1997; entitled "Accelerated Graphics Port Memory Mapped Status and Control Registers" by Ronald T. Horan, Phillip M. Jones, Gregory N. Santos, Robert Allan Lester and Robert C. Elliott; both are hereby incorporated by reference.

BACKGROUND OF THE INVENTION

1. Field of the Invention

The present invention relates to a computer system using a core logic chipset to interface a central processor(s) (CPU), an accelerated graphics port (AGP) video processor, and input-output peripherals to a system memory, and more particularly, in optimizing the performance of the central processor(s), AGP video processor and input-out peripherals with the computer system memory by using a programmable system memory access arbiter in the core logic chipset.

2. Description of the Related Technology

Use of computers, especially personal computers, in business and at home is becoming more and more pervasive because the computer has become an integral tool of most information workers who work in the fields of accounting, law, engineering, insurance, services, sales and the like. Rapid technological improvements in the field of computers have opened up many new applications heretofore unavailable or too expensive for the use of older technology mainframe computers. These personal computers may be stand-alone workstations (high end individual personal computers), desk-top personal computers, portable lap-top computers and the like, or they may be linked together in a network by a "network server" which is also a personal computer which may have a few additional features specific to its purpose in the network. The network server may be used to store massive amounts of data, and may facilitate interaction of the individual workstations connected to the network for electronic mail ("E-mail"), document databases, video teleconferencing, white boarding, integrated enterprise calendar, virtual engineering design and the like. Multiple network servers may also be interconnected by local area networks ("LAN") and wide area networks ("WAN").

A computer system has a plurality of information (data and address) buses such as a host bus, a memory bus, high speed expansion buses such as an Accelerated Graphics Port (AGP) bus, a Peripheral Component Interconnect (PCI) bus, and other peripheral buses such as the Small Computer System Interface (SCSI), Extension to Industry Standard Architecture (EISA), and Industry Standard Architecture (ISA). The processor(s) of the computer system communicates with main memory and with the peripherals that make up the computer system over these various buses.

A significant part of the ever increasing popularity of the personal computer, besides its low cost relative to just a few years ago, is its ability to run sophisticated programs and perform many useful and new tasks. Personal computers today may be easily upgraded with new peripheral devices for added flexibility and enhanced performance. A major advance in the performance of personal computers (both workstation and network servers) has been the implementation of sophisticated peripheral devices such as video graphics adapters, local area network interfaces, SCSI bus adapters, full motion video, redundant error checking and correcting disk arrays, and the like.

The peripheral devices' data transfer speeds are achieved by connecting the peripheral devices to the microprocessor (s) and associated system random access memory through high speed expansion local buses. Most notably, a high speed expansion local bus standard has emerged that is microprocessor independent and has been embraced by a significant number of peripheral hardware manufacturers and software programmers. This high speed expansion bus standard is called the "Peripheral Component Interconnect" or "PCI." A more complete definition of the PCI local bus may be found in the PCI Local Bus Specification, revision 2.1; PCI/PCI Bridge Specification, revision 1.0; PCI System Design Guide, revision 1.0; PCI BIOS Specification, revision 2.1, and Engineering Change Notice ("ECN") entitled "Addition of 'New Capabilities' Structure," dated May 20, 1996, the disclosures of which are hereby incorporated by reference. These PCI specifications and ECN are available from the PCI Special Interest Group, P.O. Box 14070, Portland, Oreg. 97214 (hereinafter referred to as "the PCI Specification").

Increasingly inexpensive but sophisticated microprocessors have revolutionized the role of the personal computers by enabling complex applications software to run at mainframe computer speeds. The latest microprocessors have brought the level of technical sophistication to personal computers that, just a few years ago, was available only in mainframe and mini-computer systems. Some representative examples of these new microprocessors are the "PENTIUM," "PENTIUM PRO" and PENTIUM II (registered trademarks of Intel Corporation). Advanced microprocessors are also manufactured by Advanced Micro Devices, Cyrix, IBM, Digital Equipment Corp., Sun Microsystems and Motorola.

These sophisticated microprocessors have, in turn, made possible running complex application programs using advanced three dimensional ("3-D") graphics for computer aided drafting and manufacturing, engineering simulations, games and the like. Increasingly complex 3-D graphics require higher speed access to ever larger amounts of graphics information stored in memory. This memory may be part of the video graphics processor system, but, preferably, would be best (lowest cost) if part of the main computer system memory because shifting graphics information from local graphics memory to main memory significantly reduces computer system costs when implementing 3-D graphics. Intel Corporation has proposed a low cost but improved 3-D graphics standard called the "Accelerated Graphics Port" (AGP) initiative. With AGP 3-D, graphics data, in particular textures, may be shifted out of the graphics controller local memory to computer system main memory. The computer system main memory is lower in cost than the graphics controller local memory and is more easily adapted for a multitude of other uses besides storing graphics data.

The proposed Intel AGP 3-D graphics standard defines a high speed data pipeline, or "AGP bus," between the graphics controller and system main memory. This AGP bus has sufficient bandwidth for the graphics controller to retrieve textures from system memory without materially affecting computer system performance for other non-graphics operations. The Intel 3-D graphics standard is a specification which provides signal, protocol, electrical, and mechanical specifications for the AGP bus and devices attached thereto. This specification is entitled "Accelerated Graphics Port Interface Specification Revision 1.0," dated Jul. 31, 1996, the disclosure of which is hereby incorporated by reference (hereinafter referred to as "the AGP Specification"). The AGP Specification is available from Intel Corporation, Santa Clara, Calif.

A major performance/cost enhancement using AGP in a computer system is accomplished by shifting texture data structures from local graphics memory to main memory. Textures are ideally suited for this shift for several reasons. Textures are generally read-only, and therefore problems of access ordering and coherency are less likely to occur. Shifting of textures serves to balance the bandwidth load between system memory and local graphics memory, since a well-cached host processor has much lower memory bandwidth requirements than does a 3-D rendering machine; texture access comprises perhaps the single largest component of rendering memory bandwidth, so avoiding loading or caching textures in local graphics memory saves not only this component of local memory bandwidth, but also the bandwidth necessary to load the texture store in the first place, and, further, this data must pass through main memory anyway as it is loaded from a mass store device. Texture size is dependent upon application quality rather than on display resolution, and therefore may require the greatest increase in memory as software applications become more advanced. Texture data is not persistent and may reside in the computer system memory only for the duration of the software application, so any system memory spent on texture storage can be returned to the free memory heap when the application concludes (unlike a graphic controller's local frame buffer which may remain in persistent use). For these reasons, shifting texture data from local graphics memory to main memory significantly reduces computer system costs when implementing 3-D graphics. The AGP bus is capable of functioning in both a 1× mode (264 MB/s peak) and a 2× mode (532 MB/s peak). The AGP bus is defined as a 32 bit bus, and may have up to four bytes of data transferred per clock in the 1× mode and up to eight bytes of data per clock in the 2× mode. The PCI bus is defined as either a 32 bit or 64 bit bus, and may have up to four or eight bytes of data transferred per clock, respectively. The AGP bus has additional sideband signals which may be used to transfer address information, leaving the AD bus free for just data transfers. Thus the AGP bus allows more efficient block data transfers then is possible using the PCI bus which must alternate between transferring address and data information on its AD bus. An AGP bus running in the 2× mode with sideband signals provides sufficient video data throughput (maximum of 532 MB/s peak) to allow increasingly complex 3-D graphics applications to run on personal computers.

The AGP bus bandwidth required for video data throughput, however, places a burden on the performance of the system memory in relation to the other computer system agents (CPU, PCI, AGP, SCSI, etc.) also needing access to the system memory. Memory access requests from the computer system agents and memory refresh cycles may occur concurrently. A memory access arbiter determines which and in what order the system agents are granted memory accesses. The memory access arbiter, in conjunction with the memory interface control logic, also controls memory refresh cycles which may occur every 15.625 microseconds. The memory access arbiter is located in the computer system core logic chipset, and must grant accesses to the system memory so that no system agent is starved from lack of timely access thereto. If memory accesses are granted arbitrarily, however, increased latency times and decreased computer system performance may result.

Since AGP is a new technology, it is difficult to determine in advance the load an AGP agent will place on the computer system memory, or how the AGP memory accesses may affect the memory access efficiencies of the other system agents (CPU, PCI, etc.). In addition, a core logic chipset may be used across multiple product lines (i.e., workstations, servers, desktop PCs, portables, and the like), thus it is difficult to develop a fixed or hard wired memory access arbiter optimized for the different combinations of system agents used in the various types of computer systems. Also, different types of software programs such as graphics intensive, computation intensive or data transfer intensive program activities may affect the memory access requirements of the different system agents.

What is needed is a system, method and apparatus for improving computer system performance by optimizing system memory accesses of the computer system agents in a variety of computer system applications.

SUMMARY OF THE INVENTION

The present invention overcomes the above-identified problems as well as other shortcomings and deficiencies of existing technologies by providing in a computer system a core logic chipset that comprises a programmable memory access arbiter that may be programmed for optimizing the number of accesses and the maximum number of cachelines transferred per access for each of the computer system agents in order to achieve best computer system performance. The operation of the programmable memory access arbiter may be programmed via a register(s) in the core logic chipset. The computer system basic input-output operating system (BIOS), applications programs and the like may write to the programmable memory access arbiter register (s). Manual or automatic (plug and play) setup may be used to configure the values in the programmable memory access arbiter register(s) based on the application and/or peripheral devices found in the computer system. The core logic chipset also interconnects a central processor(s), system memory, and peripheral devices such as AGP, PCI and the like. The system memory may be, for example, synchronous dynamic random access memory (SDRAM).

The memory control and interface logic for the SDRAM may be optimized for reading and/or writing a desired number of bytes of information for each memory transaction. A desired number of bytes of information may be, for example, 32 bytes, and may be referred to hereinafter as a "cacheline" or "data paragraph." The number of bytes comprising the cacheline or data paragraph may be optimized for the SDRAM and processor of the computer system. One of ordinary skill in the art will readily appreciate that a cacheline or data paragraph may comprise any number of bytes of information, preferably in increments of $2^n$, where n is a positive integer number. The present invention contemplates a cacheline or data paragraph of any size, the cacheline size being determined solely by the computer system platform and type of system memory used in the computer system.

The purpose of the memory access arbiter is to make sure every system agent requesting access to the system memory is serviced in a timely and most efficient manner, otherwise a system agent may be "starved" for data from the system memory. If one or more of the system agents are constantly requesting memory accesses (i.e., transfer of AGP textures) "round robin" or equal order sharing arbiter routines may give timely memory access to slower system agents but starve other system agents (i.e., central processor unit and AGP) requiring high data throughput access to the system memory.

The memory access arbiter may also be used to optimize memory page hits from multiple system agent access requests. A page of memory must be selected when accessing a system memory location(s). In order to select a new page of memory, the memory controller must first precharge the appropriate memory address lines by shutting down the previously selected page of memory, activate the appropriate address lines for the new page of memory, and then access the contents addressed by either reading from or writing to the selected address(es) of the new page of memory. The memory access arbiter may select system agents requesting memory accesses in an order that optimizes utilization of a presently selected page of memory. For example, three system agents are requesting system memory accesses, two system agents are requesting access to memory addresses that are of a presently selected page of memory, the other system agent is requesting an access to a non-selected page of the system memory. If the memory access arbiter granted memory access in a consecutive or round robin manner, the same page of memory might be deselected and reselected for the different system agents requesting that page of memory. If, however, the system agents requesting memory access to the same page of memory could be serviced consecutively together, a significant amount of memory access overhead time could be saved since the common page of memory would already be available for access.

The memory controller must also ensure timely dynamic memory refresh cycles between system agent memory accesses. Each page of dynamic RAM must be refreshed within, for example, 15.625 microseconds. There is a window of time in which the page of RAM may be refreshed. Preferably, the memory controller performs refresh cycles when no system agent is requesting a memory access, i.e., the system memory is idle. However, if there are continuous memory access requests by the system agents, then the memory controller is forced to perform a refresh cycle within the time window designed into the core logic chipset, and will do so when necessary.

In an embodiment of the present invention, the memory access arbiter may be programmed specifically for each system agent. For example, the memory access arbiter may be programmed for one (1), two (2), three (3) or four (4) CPU agent memory access transactions for every one (1) AGP agent memory access transaction. The dynamic memory refresh cycle must take precedence over any present or pending agent memory access transaction if the refresh time window is nearing expiration. An access count register(s) may be incorporated into the core logic chipset wherein each system agent may be associated with different portions of this access count register. As an example but not a limitation, each portion of the access count register may comprise two bits. These two bits of each portion can represent up to four different count values, i.e., $00_b$=one access, $01_b$=two accesses, $10_b$=three accesses, and $11_b$=four accesses for the respective system agent. Thus the portion of the access count register associated with the CPU agent may be set to $11_b$, and the portions associated with the other system agents may be set to $00_b$. This configuration gives the CPU agent four memory access transactions for each one of the other system agent memory access transactions. According to the present invention, it is contemplated that the portions of the access count register(s) may be any number of bits in size, and may be programmed with any value representing the number of consecutive system memory access transactions that the associated system agents may take. Thus any combination of system agent access transaction "ratios" may be utilized with the present invention.

In a further embodiment of the present invention, the maximum number of cachelines transferred in each memory access transaction is programmable and may be different for each of the system agents. The AGP specification defines an AGP device memory access request transaction size of from one quadword to eight cachelines. Therefore, for example, one system agent (AGP) memory access transaction may comprise from one to eight cachelines of memory. The access count register(s) may further comprise additional portions thereof. Each one of these additional portions is associated with a system agent, and each one may be programmed for a maximum number of cachelines that may be transferred during the system agent memory access transaction. As an example but not a limitation, each additional portion of the access count register(s) may comprise three bits. These three bits of each additional portion can represent up to eight different values for the maximum number of cachelines which may be transferred during a memory access transaction. A lesser number of cachelines may be transferred during a memory access transaction depending on the system agent's request. According to the present invention, it is contemplated that the additional portions of the access count register(s) may be any number of bits in size, and may be programmed with any value representing the maximum number of cachelines which may be transferred during a system agent's memory access transaction.

The access count register(s) may be addressed in the core logic chipset's configuration space, and may be capable of both read and write accesses. A software program in the system BIOS may initially configure values in the access count register(s), and other system software may subsequently change these values in each system agent portion thereof. Various agent latency timers and other indicia of system performance may be used to determine the overall computer system operating efficiencies, and, if necessary, software may dynamically change the values of the portions and additional portions associated with each of the system agents so as to optimize system memory access transactions for best computer system performance.

The access count register(s) may be optimally programmed for the type of application programs being used in the computer system. For example, a computer used for graphics intensive programs, such as non-linear video editing, will generally perform best when the AGP agent is given the maximum number of memory access transactions without starving the CPU for memory access. On the other hand, a computer used as a file server will have little demand for graphics memory accesses, but will need extensive memory input-output accesses during transfer of data to and from client computers. The file server will perform best when the PCI agent(s) has a greater number of memory accesses available then, for example, the video processor (AGP agent). In a workstation doing math intensive computations (i.e., spreadsheets) the CPU may be given a predominate number of concurrent memory access transactions, and when doing word processing all system agents may be given an equal number of memory access transactions. It is contemplated herein that the program scheduler of the computer system operating system may dynamically change the portion and additional portion values in the access count register(s) associated with each system agent depending upon which application program thread is running in the computer system. Thus, the memory access arbiter of the present invention can optimize system memory access transactions of the system agents for an overall improvement in the performance of the computer system.

Other and further features and advantages will be apparent from the following description of presently preferred embodiments of the invention, given for the purpose of disclosure and taken in conjunction with the accompanying drawings.

DETAILED DESCRIPTION OF THE PREFERRED EMBODIMENTS

Figure 1:
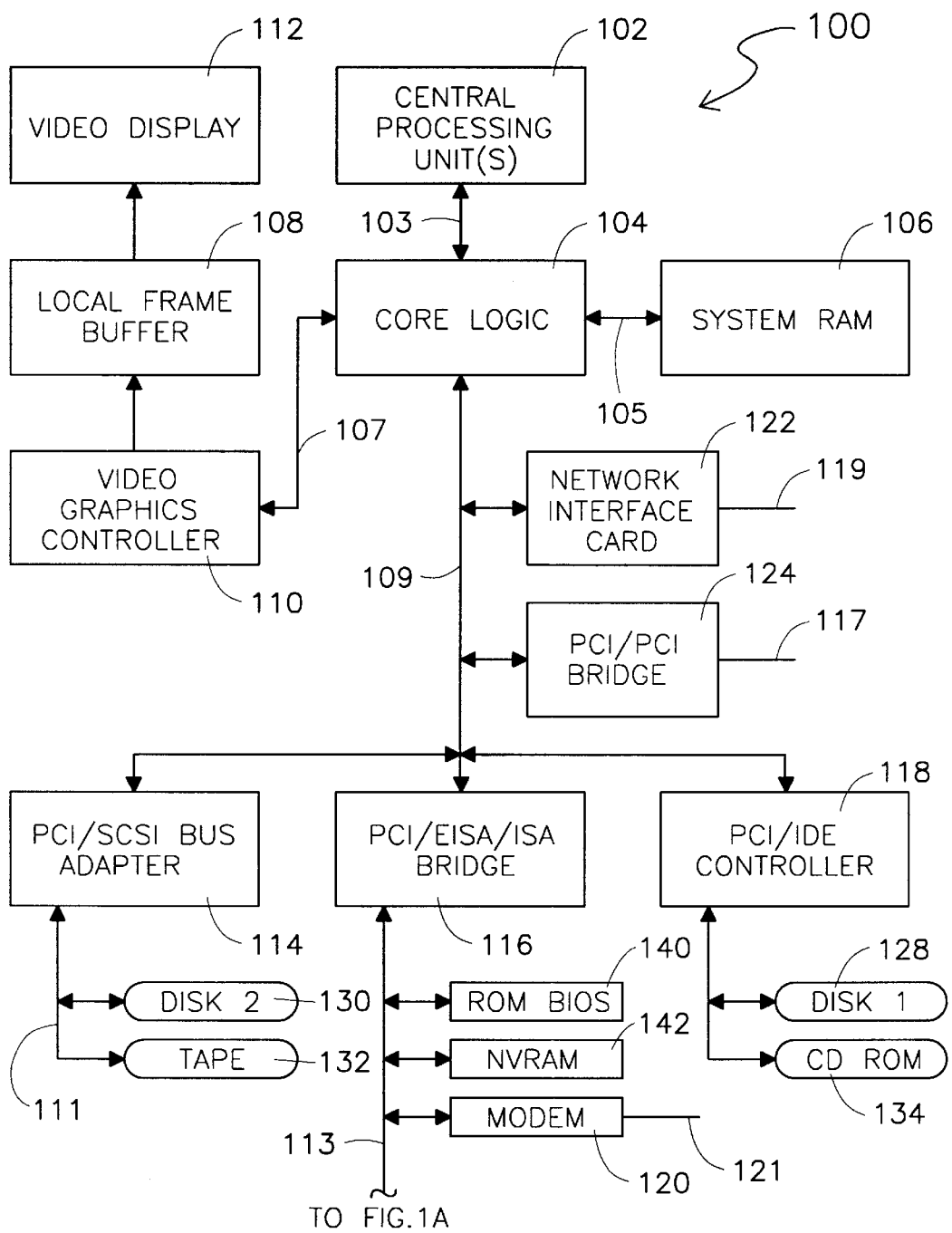
FIGS. 1 and 1A is a schematic block diagram of a computer system according to the present invention.

The present invention provides in a computer system a core logic chipset that interconnects a central processor(s) (CPU), a system memory and peripheral devices (AGP, PCI, etc.). A memory control and interface logic of the core logic chipset is used for memory accesses, both read and write, and for performing refresh cycles of the system memory. The system memory may be synchronous dynamic random access memory (SDRAM) and the like.

For purposes of discussion and illustration hereinafter, a byte is eight (8) bits, wherein a bit is a representation of a binary one or zero (electrical circuit on or off, respectively); a word is two (2) bytes or 16 bits; a doubleword is two (2) words, four (4) bytes or 32 bits; a quadword is four (4) words, eight (8) bytes or 64 bits, and a cacheline or data paragraph is four (4) quadwords or 32 bytes. One of ordinary skill in the art will readily appreciate that a cacheline or data paragraph may comprise any number of bytes of information, preferably in increments of $2^n$, where n is a positive integer number. The present invention contemplates a cacheline or data paragraph of any size, the cacheline size being determined solely by the computer system platform and type of main memory used in the computer system.

The memory control and interface logic may perform memory accesses for a certain number of bytes of information, a cacheline, at one time. The number of bytes of information (cacheline) accessed by the memory control and interface logic in one memory access transaction is designed to result in the most efficient operation of the system memory, ultimately resulting in the highest memory bandwidth or data throughput. Different types of computer systems, i.e., using various combinations of microprocessors and types of system memory, may have a different optimum number of bytes of information that may be accessed at one time.

The AGP Specification entitled "Accelerated Graphics Port Interface Specification Revision 1.0," dated Jul. 31, 1996, as referenced above and incorporated by reference herein, is available from Intel Corporation. Further definition and enhancement of the AGP Specification is more fully defined in "Compaq's Supplement to the 'Accelerated Graphics Port Interface Specification Version 1.0'," Revision 0.8, dated Apr. 1, 1997, and is hereby incorporated by reference. Both of these AGP specifications were included as Appendices A and B in commonly owned, co-pending U.S. patent application Ser. No. 08/853,289; filed May 9, 1997, entitled "Dual Purpose Apparatus, Method and System for Accelerated Graphics Port and Peripheral Component Interconnect" by Ronald T. Horan and Sompong Olarig, and which is hereby incorporated by reference. A detailed description of enhancements made to AGP is also disclosed in commonly owned, co-pending patent application U.S. patent application Ser. No. 08/941,862; filed Sep. 30, 1997, entitled "Accelerated Graphics Port Memory Mapped Status and Control Registers" by Ronald T. Horan, Phillip M. Jones, Gregory N. Santos, Robert Allan Lester, and Robert Elliott, and is hereby incorporated by reference.

Figure 1A:
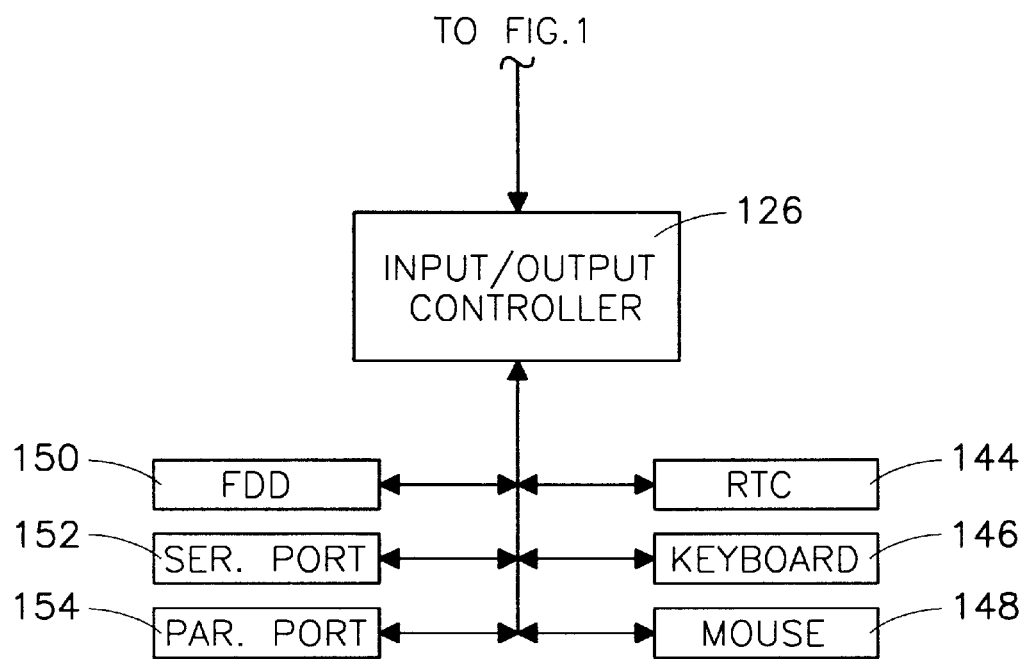

Referring now to the drawings, the details of preferred embodiments of the present invention are schematically illustrated. Like elements in the drawings will be represented by like numbers, and similar elements will be represented by like numbers with a different lower case letter suffix. Referring now to FIGS. 1 and 1A, a schematic block diagram of a computer system utilizing the present invention is illustrated. A computer system is generally indicated by the numeral 100 and comprises a central processing unit(s) (CPU) 102, core logic 104, system random access memory ("RAM") 106, a video graphics controller 110, a local frame buffer 108, a video display 112, a PCI/SCSI bus adapter 114, a PCI/EISA/ISA bridge 116, and a PCI/IDE controller 118. Single or multilevel cache memory (not illustrated) may also be included in the computer system 100 according to the current art of microprocessor computer systems. The CPU 102 may be a plurality of CPUs 102 in a symmetric or asymmetric multi-processor configuration. The video graphics controller 110 may also be referred to hereinafter as an "AGP processor," "AGP bus agent" or "AGP agent."

The CPU(s) 102 is connected to the core logic 104 through a host bus 103. The system RAM 106 is connected to the core logic 104 through a memory bus 105. The video graphics controller 110 is connected to the core logic 104 through an AGP bus 107. The PCI/SCSI bus adapter 114, PCI/EISA/ISA bridge 116, and PCI/IDE controller 118 are connected to the core logic 104 through a PCI bus 109. Also connected to the PCI bus 109 are a network interface card ("NIC") 122 and a PCI/PCI bridge 124. Some of the PCI devices such as the NIC 122 and PCI/PCI bridge 124 may plug into PCI connectors on the computer system 100 motherboard (not illustrated).

Hard disk 130 and tape drive 132 may be connected to the PCI/SCSI bus adapter 114 through a SCSI bus 111. The NIC 122 is connected to a local area network 119. The PCI/EISA/ISA bridge 116 connects over an EISA/ISA bus 113 to a ROM BIOS 140, non-volatile random access memory (NVRAM) 142, modem 120, and input-output controller 126. The modem 120 connects to a telephone line 121. The input-output controller 126 interfaces with a keyboard 146, real time clock (RTC) 144, mouse 148, floppy disk drive ("FDD") 150, a serial port 152, and a parallel port 154. The EISA/ISA bus 113 is a slower information bus than the PCI bus 109, but it costs less to interface with the EISA/ISA bus 113.

Figure 2:
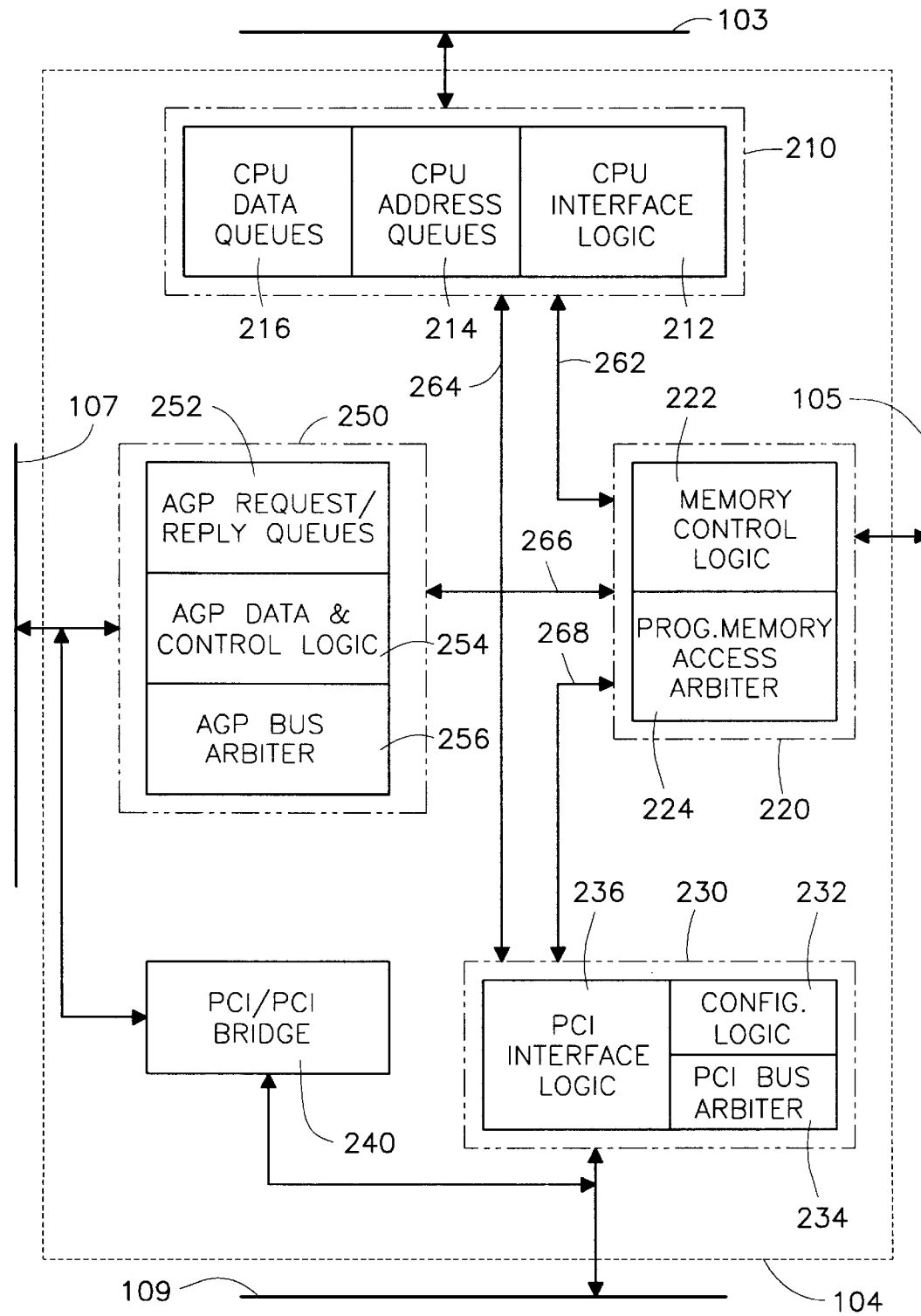
FIG. 2 is a schematic functional block diagram of an embodiment of the present invention according to the computer system of FIGS. 1 and 1A.

Referring now to FIG. 2 and according to the present invention, a schematic functional block diagram of the core logic 104 of FIGS. 1 and 1A is illustrated. The core logic 104 functionally comprises a CPU host bus interface 210, a memory interface 220, a PCI interface 230, a PCI/PCI bridge 240, and an AGP interface 250. The CPU host bus interface 210 comprises CPU interface logic 212, CPU address queues 214 and CPU data queues 216. The memory interface 220 comprises memory control logic 222 and a programmable memory access arbiter 224. The PCI interface 230 comprises PCI configuration logic 232, a PCI bus arbiter 234 and PCI interface logic 236. The AGP interface 250 comprises AGP request/reply queues 252, AGP data and control logic 254 and an AGP bus arbiter 256.

The CPU host bus interface 210 connects to the host bus 103, and the CPU interface logic 212 handles all data, address and control signals associated with the CPU(s) 102 of the computer system 100. Multiple CPUs 102 and cache memory associated therewith (not illustrated) are contemplated and within the scope of the present invention. The CPU host bus interface 210 is connected with the PCI interface 230 over a core logic bus 264, and with the memory interface 220 over a core logic bus 262. The AGP interface 250 is connected with the memory interface 220 over a core logic bus 266. The PCI interface 230 is connected with the memory interface 220 over a core logic bus 268. An advantage of having separate core logic buses 262, 264, 266 and 268 is that concurrent bus operations may be performed thereover. For example, AGP graphics data stored in system RAM 106, connected to the bus 105, may be transferring to the video graphics controller 110 (AGP device) on the AGP bus 107 while the CPU 102 on the host bus 103 is accessing an independent PCI device (i.e., NIC 122) on the PCI bus 109.

The host bus interface 210 allows the CPU 102 to pipeline cycles and schedule snoop accesses. The memory interface 220 generates the control and timing signals, including refresh cycles, for the computer system RAM 106 which may be synchronous dynamic RAM (SDRAM) and the like. The programmable memory access arbiter selects among memory accesses for CPU writes, CPU reads, PCI writes, PCI reads, AGP reads, AGP writes, and dynamic memory refresh. Arbitration may be pipelined into a current memory cycle, ensuring that the next memory address is available on the memory bus 105 before the current memory cycle is complete. This results in minimum delay, if any, between memory cycles.

The memory access arbiter 224 may also be used to optimize memory page hits from multiple system agent memory access transaction requests. A page of memory must be selected when accessing a system memory location (s),. In order to select a new page of memory, the memory controller must first precharge the appropriate memory address lines by shutting down the previously selected page of memory, then activate the appropriate address lines for the new page of memory, and then access the contents addressed during the memory access transaction by either reading from or writing to the selected address(es) of the new page of memory. The memory access arbiter 224 may select system agents requesting memory access transactions in an order that optimizes utilization of a presently selected page of memory.

The PCI bus arbiter 234 controls access of the PCI bus agents on the PCI bus 109. When the CPU 102 accesses the PCI bus 109, the PCI interface 230 operates as a PCI master. When a PCI device is a master on the PCI bus 109, the PCI interface 230 operates as a PCI slave (target). The PCI configuration logic 232 contains base address registers for PCI device targets (not illustrated) on the PCI bus 109.

Operation of PCI is more fully described in the PCI Local Bus Specification, revision 2.1; PCI/PCI Bridge Specification, revision 1.0; PCI System Design Guide, revision 1.0; PCI BIOS Specification, revision 2.1, and Engineering Change Notice ("ECN") entitled "Addition of 'New Capabilities' Structure," dated May 20, 1996, the disclosures of which are hereby incorporated by reference.

The AGP request/reply queues 252, AGP data and control logic 254 and an AGP bus arbiter 256 are connected to the AGP bus 107 and also have signal, power and ground connections (not illustrated) for implementation of data and control signals defined in both the AGP and PCI Specifications incorporated by reference herein. The AGP bus 107 is adapted for connection to an AGP device(s) and/or an AGP connector(s) (not illustrated).

The PCI/PCI bridge 240 is connected between the PCI bus 109 and the AGP bus 107. The PCI/PCI bridge 220 allows existing enumeration code in the computer system BIOS 140 to recognize and handle AGP compliant devices, such as the video graphics controller 110, residing on the AGP bus 107. The PCI/PCI bridge 240, for example, may be used in configuring the control and status registers of the AGP graphics controller 110, or the AGP data and control logic 254 by bus enumeration during POST, both being connected to the AGP bus 107.

The memory interface 220 accesses the RAM 106 whenever there are memory access transaction requests, or when doing a refresh cycle on a page of dynamic random access memory. The memory access transaction requests may be, for example but not limitation, from the CPU 102, bus agents on the PCI bus 109, or AGP bus 107. The programmable memory access arbiter 224, according to the present invention, grants one or more consecutive memory access transactions to a requesting agent according to a value in a corresponding portion of an access count register. This value represents the number of consecutive memory access transactions that may be granted to the computer system agent before another agent must be granted its memory access transaction request. The value in the portion of the access count register may be any number value, and the number of portions of the access count register(s) are associated with and equal to the number of system agents (i.e., CPU, PCI and AGP) of the computer system.

In a further embodiment of the present invention, the maximum number of cachelines transferred in each memory access transaction is also programmable and may be different for each of the system agents. Additional portions associated with the portions of the access count register(s) may be programmed for a maximum number of cachelines that may be transferred during the respective system agent memory access transaction. A lesser number than the maximum number of cachelines may be transferred during a memory access transaction depending on the system agent's request.

Figure 3:
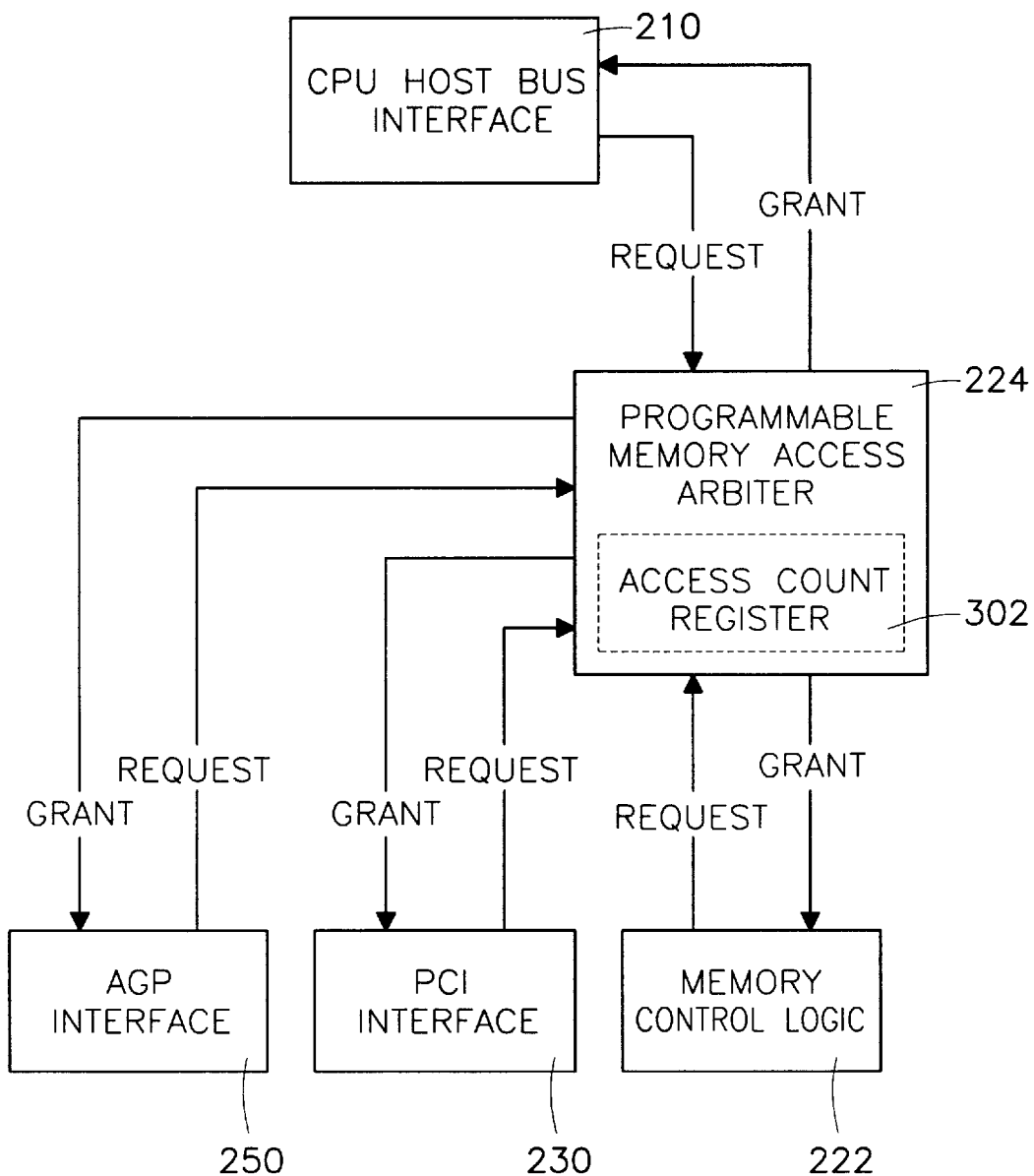
FIG. 3 is a schematic block diagram of a programmable memory access arbiter according to the present invention.

Referring now to FIG. 3, a schematic block diagram of a programmable memory access arbiter, according to the present invention, is illustrated. The programmable memory access arbiter 224 receives system memory access transaction requests from the CPU host bus interface 210, the memory control logic 222, the PCI interface 230, and the AGP interface 250. Each agent (210, 222, 230 and 250) sends a "request" signal to the programmable memory access arbiter 224 when a memory access by the requesting agent is desired. The memory access proceeds when a "grant" acknowledgment signal is returned to the requesting agent by the memory access arbiter 224. The programmable memory access arbiter 224 uses an access count register 302 in determining how many consecutive system memory access transactions an agent is allowed before another agent is given access to the system memory.

Figure 4:
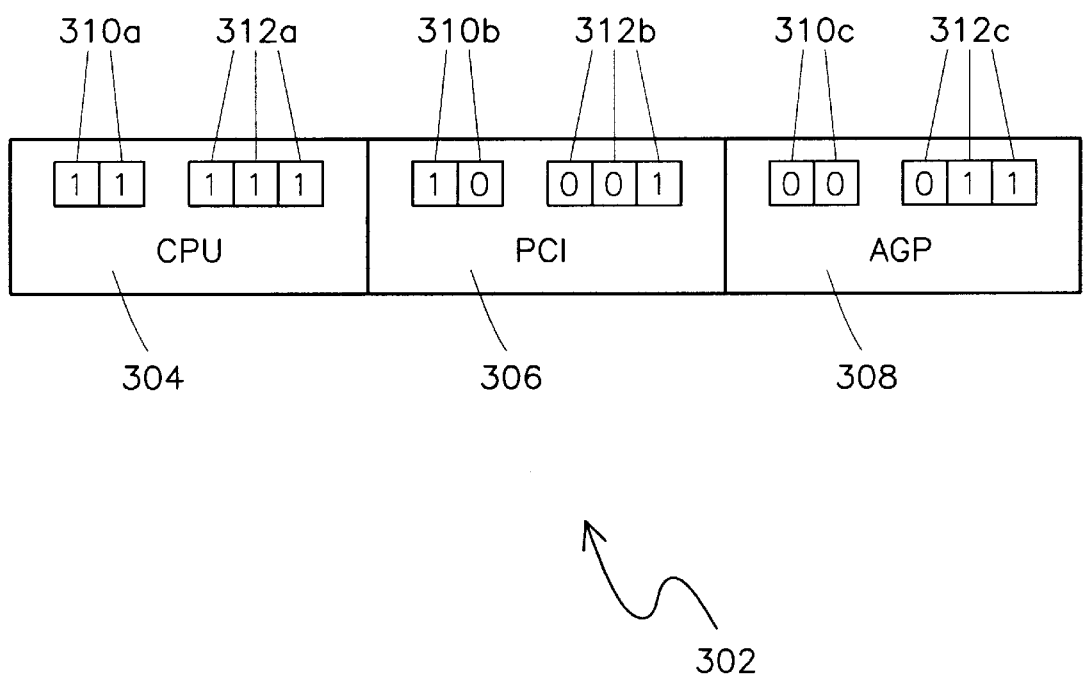
FIG. 4 is a schematic block diagram of an access count register according to the present invention.

Referring now to FIG. 4, a schematic block diagram of the access count register 302 is illustrated. The access count register 302 comprises a plurality of portions represented by numerals 304, 306 and 308. Each of the portions 304, 306 and 308 comprise a plurality of bits, represented for example but not limitation, as two bits 310 and three bits 312. The bits 310 may represent the number of consecutive memory access transactions that the memory access arbiter 224 will grant to the associated system agent (CPU, PCI or AGP). The bits 312 may represent the maximum number of cachelines that may be transferred during a single memory access transaction. For example, the AGP interface 250 may request a memory access transaction comprising the transfer of eight cachelines. If the value stored in the bits 312 is less than eight, then the arbiter 224 will only permit transfer of the number of cachelines requested for that transaction which is equal to the number stored in the bits 312. If the number of cachelines requested to be transferred is less than the number stored in the bits 312, then all of the cachelines requested are transferred during that memory access transaction.

To more fully illustrate the programmable features of the present invention, an example is as follows: The portion 304 is associated with the CPU host bus interface 210 and contains a value of $11_b$ stored in bits 310a. This value, $11_b$, indicates to the memory access arbiter 224 that the CPU host bus interface 210 may have up to four consecutive memory access transactions before another system agent (AGP interface 250 or PCI interface 230) must be given access to the memory 106. Also illustrated in this example, a value $111_b$ is stored in bits 312a and indicates to the memory access arbiter 224 that up to eight cachelines may be transferred during each memory access transaction, the number of consecutive memory access transactions being determined by the value stored in bits 310a.

The portion 306 is associated with the PCI interface 230 and contains a value of $10_b$ stored in bits 310b. This value, $10_b$, indicates to the memory access arbiter 224 that the PCI interface 230 may have up to three consecutive memory access transactions before another system agent (CPU interface 210 or AGP interface 250) must be given access to the memory 106. Also illustrated in this example, a value $001_b$ is stored in bits 312b and indicates to the memory access arbiter 224 that up to two cachelines may be transferred during each memory access transaction, the number of consecutive memory access transactions being determined by the value stored in bits 310b.

The portion 308 is associated with the AGP interface 250 and contains a value of $00_b$ stored in bits 310c. This value, $00_b$, indicates to the memory access arbiter 224 that the AGP interface 250 may have only one memory access transaction before another system agent (CPU interface 210 or PCI interface 230) must be given access to the memory 106. Also illustrated in this example, a value $011_b$ is stored in bits 312c and indicates to the memory access arbiter 224 that up to four cachelines may be transferred during the memory access transaction.

The aforementioned example illustrates up to four consecutive memory access transactions by the CPU host bus interface 210, up to two consecutive memory access transactions by the PCI interface 230, but only one memory access transaction by the AGP interface 250 before the other system agents must be given access to the system memory 106. The present invention contemplates any combination of values in the portions 304, 306 and 308.

The access count register 302 may be a read/write register accessible by the computer system BIOS during startup, or by any API or applications program. This programmability of the access count register 302 allows the computer system to be fine tuned for most efficient operation of a number of different programs and/or computer system applications. The program scheduler of the software operating system may write new values to the portions of the access count register 302 whenever a program thread starts to run so as to maximize the computer system efficiency for that particular program thread. The operating system software or applications software may use an iterative algorithm to fine tune the values for each portion of the access count register 302 so as to maximize the efficiency and speed of that program when running in the computer system. Once optimal portion values are found, they may be memorized so that those portion values may be loaded each time the associated program thread runs in the computer system.

The present invention, therefore, is well adapted to carry out the objects and attain the ends and advantages mentioned, as well as others inherent therein. While the present invention has been depicted, described, and is defined by reference to particular preferred embodiments of the invention, such references do not imply a limitation on the invention, and no such limitation is to be inferred. The invention is capable of considerable modification, alternation, and equivalents in form and function, as will occur to those ordinarily skilled in the pertinent arts. The depicted and described preferred embodiments of the invention are exemplary only, and are not exhaustive of the scope of the invention. Consequently, the invention is intended to be limited only by the spirit and scope of the appended claims, giving full cognizance to equivalents in all respects.

What is claimed is:

1. A computer system having a core logic chipset with a programmable memory access arbiter, said chipset interconnecting a processor, peripheral devices and system memory, said computer system comprising:

a processor running software programs;

a system memory;

an accelerated graphics port (AGP) processor, a core logic chipset comprising a processor interface logic, a system memory interface logic and an AGP interface logic, wherein said system memory interface logic has a programmable memory access arbiter;

said processor interface logic is connected to said processor, said system memory interface logic is connected to said system memory;

said AGP interface logic is connected to said AGP processor;

said processor interface logic and said AGP interface logic are connected to said system memory interface logic; and said programmable memory access arbiter having an access count register comprising a plurality of bits of binary storage, wherein first and second values stored in first and second portions of said plurality of bits of binary storage determine the number of consecutive system memory accesses allowed by said programmable memory access arbiter for said processor interface logic and said AGP interface logic, respectively.

2. The computer system of claim 1, wherein at least one of the software programs running in said processor writes the first and second values to said access count register.

3. The computer system of claim 2, further comprising a PCI-to-PCI bridge connected between said PCI bus and said AGP processor.

4. The computer system of claim 1, wherein at least one of the software programs running in said processor reads from and writes to said access count register.

5. The computer system of claim 1, wherein a plurality of software programs writes different values to said access count register depending on which one of the plurality of software programs is running in said processor.

6. The computer system of claim 1, wherein an optimization software program determines the first and second values for optimum performance of said processor interface logic and said AGP interface logic.

7. The computer system of claim 1, wherein a basic input-output operating system (BIOS) software writes to said access count register during computer system startup.

8. The computer system of claim 1, wherein said system memory interface logic performs dynamic memory refresh cycles on said system memory.

9. The computer system of claim 1, wherein the first and second values stored in the first and second portions of said plurality of bits of binary storage determine the number of consecutive system memory accesses and a number of cachelines transferred during each of the memory accesses allowed by said programmable memory access arbiter for said processor interface logic and said AGP interface logic, respectively.

10. The computer system of claim 1, wherein said core logic chipset further comprises:
   a peripheral component interconnect (PCI) interface logic connected to PCI input-output devices on a PCI bus;
   said PCI interface logic is connected to said processor interface logic and said system memory interface logic; and
   a third portion of said plurality of bits of binary storage store a third value, wherein the third value stored in the third portion determines the number of consecutive system memory accesses allowed by said programmable memory access arbiter for said PCI interface logic.

11. The computer system of claim 10, wherein the third values stored in the third portion of said plurality of bits of binary storage determines the number of consecutive system memory accesses and the number of cachelines transferred during each of the memory accesses allowed by said programmable memory access arbiter for said PCI interface logic.

12. The computer system of claim 1, wherein said processor is a plurality of processors.

13. The computer system of claim 1, further comprising a video display connected to said AGP processor.

14. The computer system of claim 1, further comprising a network interface card, a hard disk a floppy disk drive, a modem, a keyboard, and a mouse.

15. The computer system of claim 1, further comprising a serial port, a parallel port, a keyboard and a real time clock.

16. The computer system of claim 1, further comprising a read only memory basic input-output system (ROM BIOS), a non-volatile random access memory (NVRAM), a tape drive and a CD ROM drive.

17. A computer system having a core logic chipset with a programmable memory access arbiter, said chipset interconnecting a processor, peripheral devices and system memory, said computer system comprising:
   a processor running software programs;
   a system memory;
   peripheral devices;
   a core logic chipset comprising a processor interface logic, a system memory interface logic and a peripheral interface logic, wherein said system memory interface logic has a programmable memory access arbiter;
   said processor interface logic is connected to said processor;
   said system memory interface logic is connected to said system memory;
   said processor interface logic is connected to said system memory interface logic;
   said peripheral interface logic is connected to said system memory interface logic; and
   said programmable memory access arbiter having an access count register comprising a plurality of bits of binary storage, said plurality of bits of binary storage being arranged into a plurality of portions, said plurality of portions being associated with said processor interface logic, said system memory interface logic and said peripheral interface logic, wherein a number of consecutive system memory accesses allowed by said programmable memory access arbiter for said processor interface logic, said system memory interface logic and said peripheral interface logic are determined by values stored in said plurality of portions associated therewith.

18. The computer system of claim 17, wherein the number of consecutive system memory accesses and a number of cachelines transferred during each of the memory accesses allowed by said programmable memory access arbiter for said processor interface logic and said peripheral interface logic are determined by values stored in said plurality of portions associated therewith.

19. The computer system of claim 17, further comprising said programmable memory access arbiter granting memory access requests to a selected memory page before granting memory access requests to a non-selected memory page.

20. A method, in a computer system having a processor running software programs, a system memory, an accelerated graphics port (AGP) processor and a core logic chipset comprising a processor interface logic, a system memory interface logic and a peripheral interface logic, said system memory interface logic having a programmable memory access arbiter, wherein said processor interface logic is connected to said processor, said system memory interface logic is connected to said system memory, said processor interface logic is connected to said system memory interface logic and said peripheral interface logic is connected to said system memory interface logic, said method comprising the steps of:
   storing a plurality of values in a plurality of portions of an access count register of said programmable memory access arbiter;
   associating a plurality of values with said processor interface logic, said system memory interface logic, and said peripheral interface logic; and
   controlling the number of consecutive system memory accesses of said processor interface logic, said system memory interface logic, and said peripheral interface logic with said programmable memory access arbiter by reading the access count register storing the plurality of values associated with said processor interface logic, said system memory interface logic, and said peripheral interface logic.

21. The method of claim 20, wherein the step of storing the plurality of values is done by at least one of the software programs running in said processor.

22. The method of claim 20, further comprising the step of reading the plurality of values stored in the plurality of portions of the access count register.

23. The method of claim 20, wherein the step of storing the plurality of values comprises the steps of storing different values for the plurality of values depending on which one of a plurality of software programs is running in said processor.

24. The method of claim 20, further comprising the step of optimizing the plurality of values for optimum performance of said computer system.

25. The method of claim 20, wherein the step of storing the plurality of values is done with a basic input-output operating system (BIOS) software that writes to the access count register during computer system startup.

26. The method of claim 20, further comprising the step of performing dynamic memory refresh cycles on the system memory.

27. The method of claim 20, further comprising the step of granting memory access requests to a selected memory page before granting memory access requests to a non-selected memory page.

28. A core logic chipset adapted for connecting a computer processor and an accelerated graphics port (AGP) processor to a system memory, comprising:

a processor interface logic adapted for connection to a computer processor;

an AGP interface logic adapted for connection to an AGP device;

a system memory interface logic adapted for connection to a system memory;

said processor interface logic and said AGP interface logic are connected to said system memory interface logic said system memory interface logic having a programmable memory access arbiter; and said programmable memory access arbiter having an access count register comprising a plurality of bits of binary storage, wherein first and second values stored in first and second portions of said plurality of bits of binary storage are associated with the number of consecutive system memory accesses allowed by said programmable memory access arbiter for said processor interface logic and said AGP interface logic, respectively.

29. The core logic chipset of claim 28, wherein the first and second values stored in the first and second portions of said plurality of bits of binary storage determine the number of consecutive system memory accesses and the number of cachelines transferred during each of the memory accesses allowed by said programmable memory access arbiter for said processor interface logic and said AGP interface logic, respectively.

30. The core logic chipset of claim 28, further comprising:

a peripheral component interconnect (PCI) interface logic adapted for connection to PCI input-output devices on a PCI bus;

said PCI interface logic is connected to said processor interface logic and said system memory interface logic; and a third portion of said plurality of bits of binary storage store a third value, wherein the third value stored in the third portion determines the number of consecutive system memory accesses allowed by said programmable memory access arbiter for said PCI interface logic.

31. The core logic chipset of claim 30, wherein the third values stored in the third portion of said plurality of bits of binary storage determines the number of consecutive system memory accesses and the number of cachelines transferred during each of the memory accesses allowed by said programmable memory access arbiter for said PCI interface logic.

32. The core logic chipset of claim 28, wherein said access count register is adapted to be read from and written to by a software program.

* * * * *